United States Patent [19]

Sogawa

[11] Patent Number: 4,798,083
[45] Date of Patent: Jan. 17, 1989

[54] SYSTEM FOR MEASURING INTAKE AIRFLOW RATE IN AN ENGINE

[75] Inventor: Yoshiyuki Sogawa, Mitaka, Japan
[73] Assignee: Fuji Jukogyo Kabushiki Kaisha, Tokyo, Japan
[21] Appl. No.: 43,430
[22] Filed: Apr. 28, 1987
[30] Foreign Application Priority Data May 6, 1986 [JP] Japan .............................. 61-104412

[51] Int. Cl.⁴ .......................................... G01M 15/00
[52] U.S. Cl. .................................................. 73/118.2
[58] Field of Search ............... 73/118.2, 118.1, 861.42, 73/861.52; 364/510; 123/492, 493, 494, 436

[56] References Cited

U.S. PATENT DOCUMENTS

| | | | |
|---|---|---|---|
| 4,046,161 | 9/1983 | Locke et al. ......................... | 73/118.1 |
| 4,074,573 | 2/1978 | Nordhofen ......................... | 73/861.52 |
| 4,411,235 | 10/1983 | Shinoda et al. ..................... | 73/118.2 |
| 4,450,715 | 5/1984 | Sumal .................................. | 364/510 |
| 4,463,601 | 8/1984 | Rask ................................... | 73/118.2 |

FOREIGN PATENT DOCUMENTS 57-73831  5/1982  Japan .
59-170428  9/1984  Japan .

Primary Examiner—Jerry W. Myracle
Assistant Examiner—Robert R. Raevis
Attorney, Agent, or Firm—Martin A. Farber

[57] ABSTRACT

A system for measuring intake airflow rate in an engine has an airflow meter provided in an intake passage upstream of a throttle valve. The intake airflow rate of the flow entering into a space between the throttle valve and the cylinders of the engine, without entering into the cylinders, is calculated. The difference between the intake airflow rate measured by the airflow meter and the airflow rate of flow in the space is calculated to provide the actual intake airflow rate of flow actually entering into the cylinders.

6 Claims, 4 Drawing Sheets

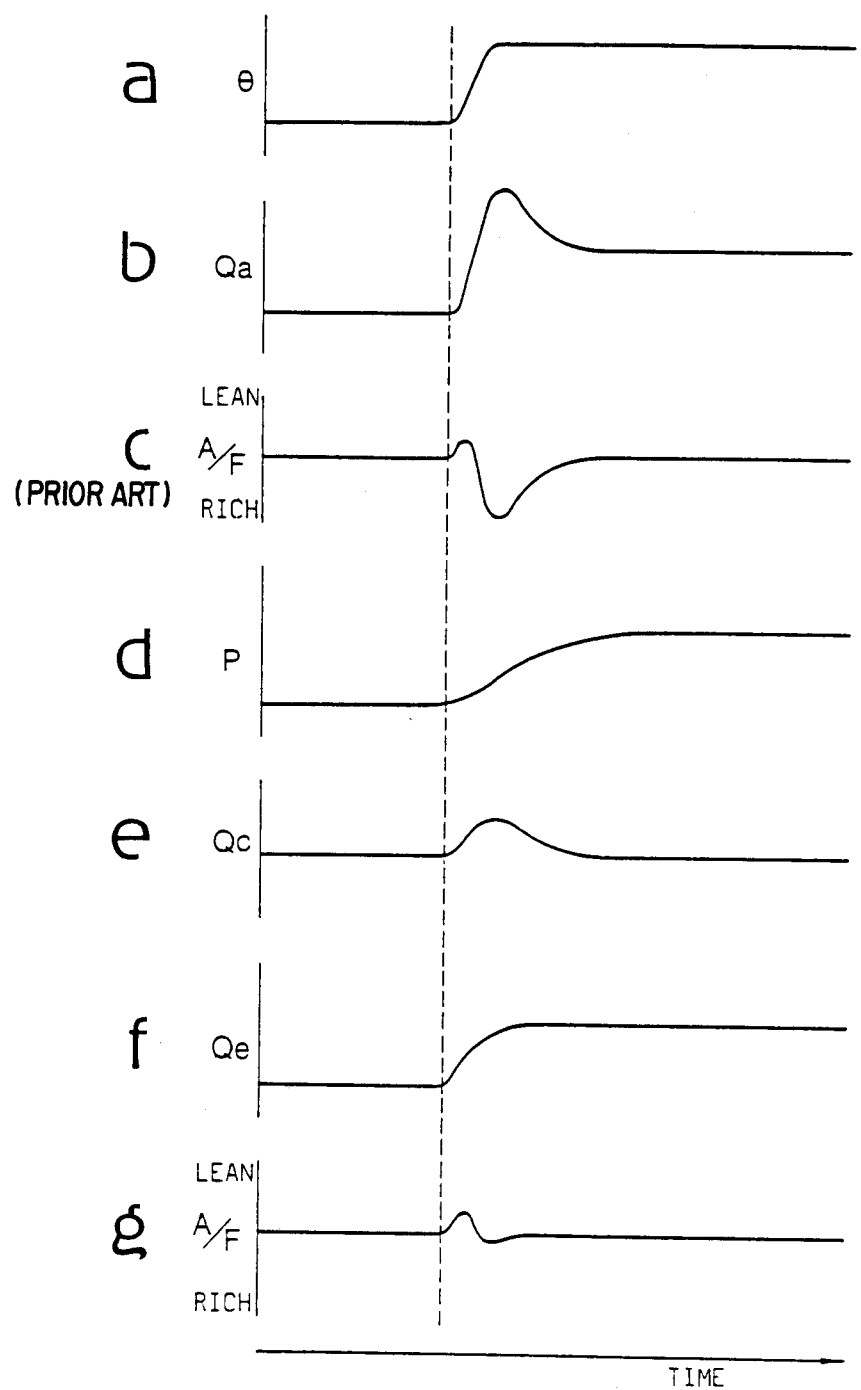

SYSTEM FOR MEASURING INTAKE AIRFLOW RATE IN AN ENGINE

BACKGROUND OF THE INVENTION

The present invention relates to a system for measuring an intake airflow rate in an engine for a motor vehicle, in order to determine the fuel injection time and the ignition timing.

In a known fuel injection system, an airflow meter is provided in an intake passage at a position upstream of a throttle valve to detect the intake airflow rate (Q). The fuel injection time Tp is determined by a calculation of $Tp = Q/N$ (N is engine speed).

Further, the ignition timing is also determined by using the intake airflow rate. Accordingly, a high accuracy is required in measuring the intake airflow rate. However, in the prior art, it is difficult to accurately measure the intake airflow rate as described hereinafter.

Since the airflow meter is positioned upstream of the throttle valve, the intake air induced into a cylinder of the engine is not directly measurable. Namely, there is a space between the throttle valve and the cylinder, such as a chamber formed downstream of the throttle valve and an intake manifold. Accordingly, when the throttle valve is rapidly opened, the induced air enters into the space to increase the pressure in the space. In other words, an amount of air sufficient to increase the pressure in the space is included in the induced air through the throttle valve. The airflow meter measures the intake airflow rate including the air which is not induced into the cylinder. Accordingly, the measured intake airflow rate increases temporarily. If the injection time is calculated based on the increased intake airflow rate, the fuel injector supplies a larger quantity of fuel than the necessary quantity, thereby enriching the air-fuel mixture. The enrichment of the mixture causes a reduction of the output of engine and increases of noxious emissions such as CO and HC. Further, if the ignition timing is calculated based on the increased intake airflow rate, the timing deviates from a desired timing.

Similarly, when the throttle valve is closed, the air-fuel ratio and ignition timing deviate from desired values.

SUMMARY OF THE INVENTION

The object of the present invention is to provide a system which is able to measure the intake airflow rate with accuracy.

In accordance with the present invention, the intake airflow rate admitted in the space in the intake passage other than cylinders of the engine is calculated based on the pressure in the space. Accordingly, the actual intake airflow rate induced in the cylinders can be accurately measured by calculating the difference between the intake airflow rate measured by an airflow sensor and the intake airflow rate admitted into the space.

The other objects and features of this invention will become understood from the following description with reference to the accompanying drawings.

BRIEF DESCRIPTION OF DRAWINGS

FIGS. 5a to 5g shows variations of various values.

DETAILED DESCRIPTION OF THE PREFERRED EMBODIMENT

Figure 1:
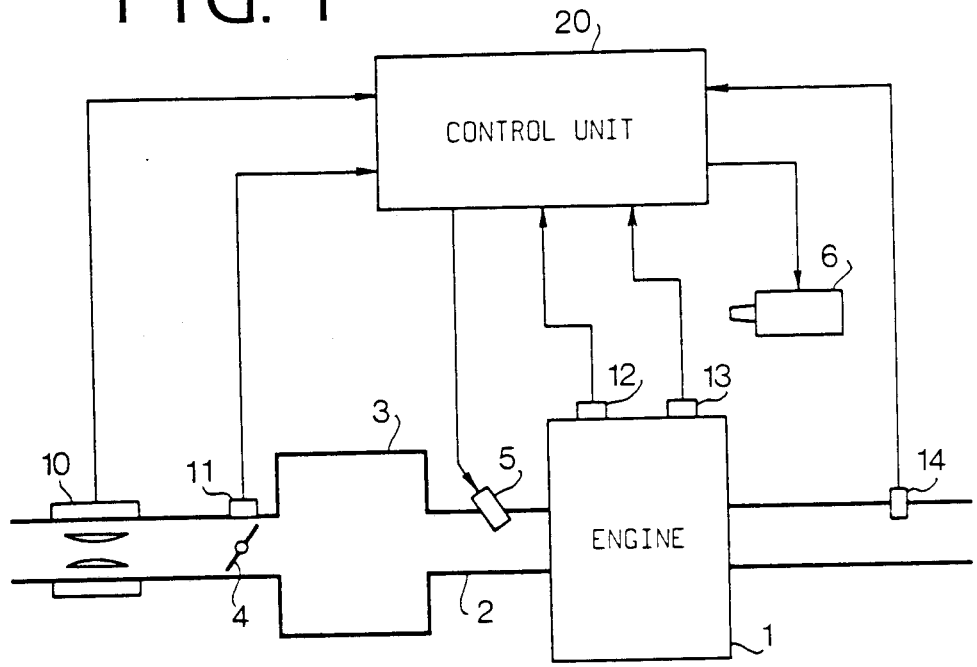
FIG. 1 is a schematic diagram showing a system according to the present invention.

Referring to FIG. 1, in an intake passage 2 of an engine 1, a throttle chamber 3 is provided downstream of a throttle valve 4 so as to absorb the pulsation of intake air. An airflow meter 10 in the form of a hot wire is provided upstream of the throttle valve 4 and multiple fuel injectors 5 are provided in the intake passage at positions adjacent intake valves so as to supply fuel to each cylinder of the engine 1. A throttle position sensor 11, coolant temperature sensor 12, crank angle sensor 13 and $O_2$-sensor 14 are provided for detecting respective conditions, and output signals of the sensors are applied to a control unit 20 comprising a microcomputer to operate the fuel injectors 5 and an ignition coil 6. The control unit 20 makes a computation of a basic fuel injection time $Tp = Q/N$ and the basic fuel injection time is corrected by a coolant temperature signal from the sensor 12, and by a feedback signal from the $O_2$-sensor 14.

Figure 2:
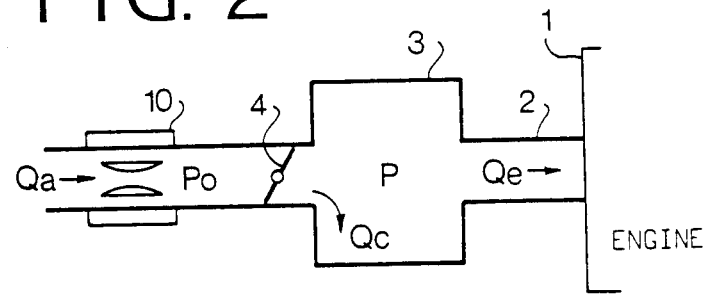
FIG. 2 is a schematic view of an intake system.

A principle of measurement of the intake airflow rate according to the present invention is described with reference to FIGS. 2 and 5. When the throttle valve 4 is rapidly opened (FIG. 5(a)), the intake airflow rate Qa measured by the airflow meter 10 increases and overshoots as shown in FIG. 5(b). FIG. 5(c) shows the variation of air-fuel ratio in the prior art where the air-fuel ratio becomes small (rich mixture). The control unit 20 operates to estimate the actual intake airflow rate Qe induced into a cylinder of the engine 1 by calculating the intake airflow rate Qc of flow admitted into the chamber 3 and intake passage 2 to increase the pressure therein, as described hereinafter.

The intake airflow rate Qa of flow passing through the throttle valve 4 can be obtained by using Bernoulli's theorem, as follows.

$$Qa = C \times A(\theta) \times \sqrt{Po - P}$$

where C is a constant, $A(\theta)$ is a function determined by the opening degree $\theta$ of the throttle valve 4, Po is pressure in the intake passage 2 at the upstream side of the throttle valve 4, and P is the pressure in the throttle chamber 3.

Therefore, $$P = Po - B(\theta) \times Qa^2$$

where $B(\theta) = 1/\{C^2(A(\theta))^2\}$ $B(\theta)$ is a function of the throttle opening degree $\theta$ and Po and C are constants. This data is stored in memories for use in the calculation of the pressure P.

The intake airflow rate Qc increasing the pressure P can be calculated by differentiating of the pressure P with respect to time (dp/dt) as follows.

$$Qc = dp/dt \times C1 \quad (C1 = \text{constant})$$

Accordingly, the actual intake airflow rate Qe is $$Qe = Qa - Qc$$

Thus, the necessary fuel injection time Tp is calculated based on the intake airflow rate Qe. FIGS. 5(d) to (f) show variations of pressure P and intake airflow rates Qc and Qe, and FIG. 5(g) shows an improved air-flow ratio.

Figure 3:
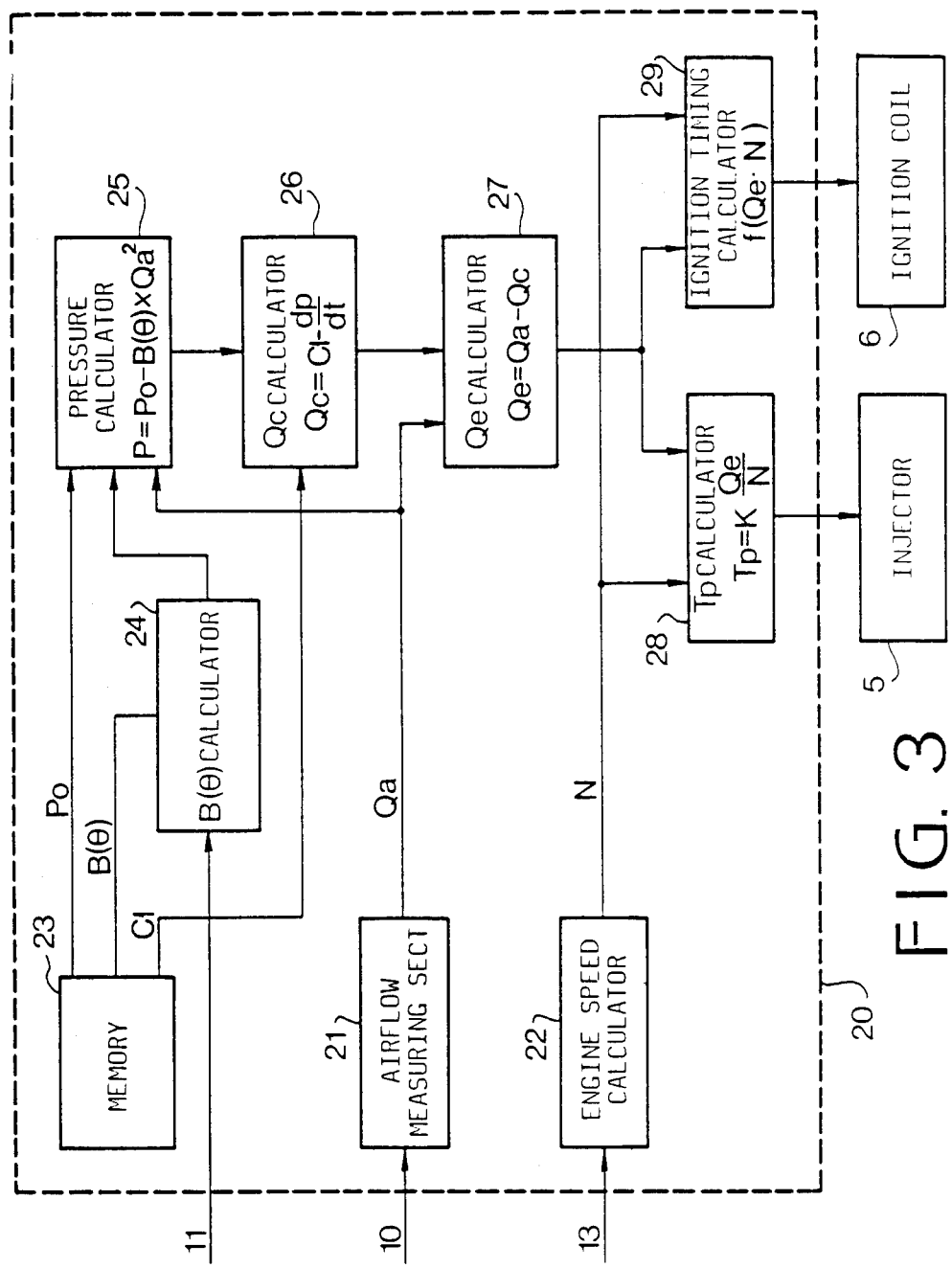
FIG. 3 is a block diagram showing an embodiment of the present invention.

Referring to FIG. 3 showing the control unit 20 as an embodiment of the invention, the control unit is provided with an airflow measuring section 21 for producing the intake airflow rate Qa from the output signal of the airflow meter 10, an engine speed calculator 22 for calculating engine speed N based on the output signal of the crank angle sensor 13, and a B($\theta$) calculator 24 for calculating (obtaining) the value of the function B($\theta$) from a memory 23 based on the output signal $\theta$ of the throttle position sensor 11. The memory 23 is stored with the constants C and Po and the function B($\theta$) which is a function of $\theta$. A pressure calculator 25 is provided to make the calculation of $P=Po-B(\theta)\times Qa^2$ based on output signals Po, B($\theta$), Qa of memory 23, calculator 24 and section 21. A Qc calculator 26 is provided to calculate the $Q_c$ in response to output signals C1, P of memory 23 and pressure calculator 25, respectively, and to produce an output signal Qc. A Qe calculator 27 is provided to calculate the intake airflow rate Qe in response to output signals Qa, Qc of airflow measuring section 21 and Qc calculator 26, and to produce an output signal Qe. The fuel injection time Tp is calculated at Tp calculator 28 and the ignition timing is calculated at an ignition timing calculator 29 respectively in response to output signals N, Qe of engine speed calculator 22 and Qe calculator 27. The output signal of the Tp calculator 28 is applied to injectors 5 and the output signal of the ignition timing calculator 29 is applied to the ignition coil 6 to operate them respectively.

Figure 4:
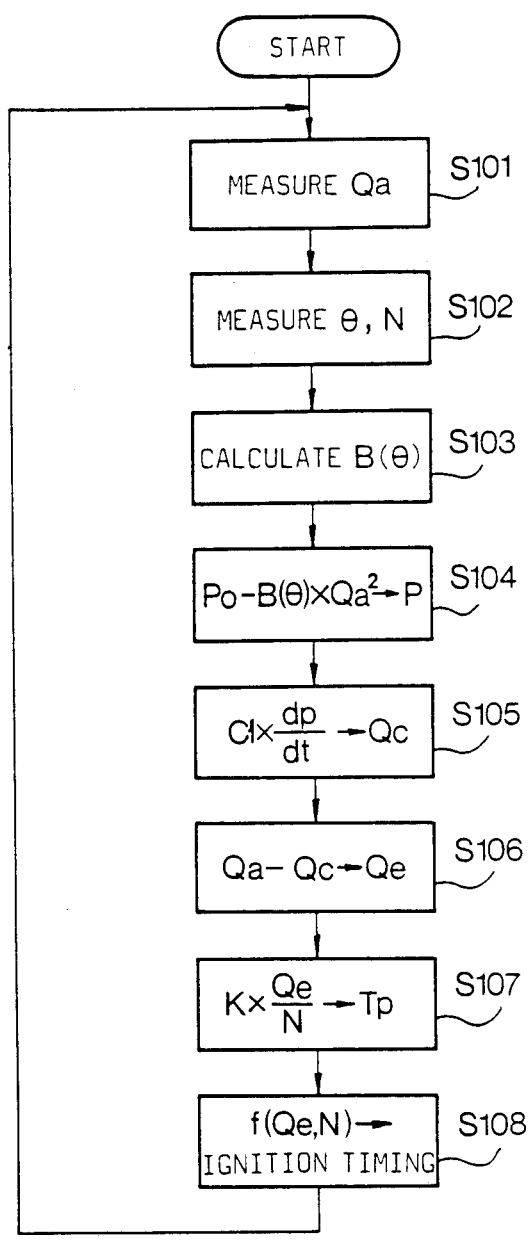
FIG. 4 is a flowchart showing the operation of the system of FIG. 3.

The operation of the system is described hereinafter with reference to FIGS. 3 and 4. The intake air flow rate Qa is measured at the airflow measuring section 21 based on the input from the airflow meter 10 (step S101). The throttle opening degree $\theta$ is obtained from the output signal of the throttle position sensor 11, and the engine speed N is calculated at calculator 22 based on the output signal of crank angle sensor 13 (step S102). The value of the function B($\theta$) is calculated at the B($\theta$) calculator 27 based on data obtained from the memory 23 in accordance with the throttle opening degree $\theta$ (step 103). The pressure calculator 25 makes the calculation of $P=Po-B(\theta)\times Qa^2$ based on output signals of memory 23, calculator 24 and section 21 (step S104). The pressure P and the constant C1 stored in the memory 23 are applied to the Qc calculator 26 to make the calculation $Qc=C1\times dp/dt$ (step S105). The actual intake airflow rate Qe is calculated at Qe calculator 27 by the calculation Qa−Qc (step S106). The fuel injection time Tp is calculated at Tp calculator 28 by the calculation of $Tp=K\times Qe/N$ (step S107). Further, the ignition timing is calculated at ignition timing calculator 29 (step S108). The output signal of the Tp calculator 28 is applied to injectors 5 to inject the fuel for a proper period of time. The output signal of the ignition timing calculator 29 is applied to the ignition coil 6 to ignite the fuel at a proper timing.

Although the above description is made about the operation at the time when the throttle valve is opened, the operation for the throttle valve closing is similar to the above described operation, thereby preventing the deviation of air-fuel ratio from increasing.

In accordance with the present invention, the intake airflow rate entering into spaces other than the cylinders of the engine is calculated based on the pressure in the spaces. Accordingly, the actual intake airflow rate induced in the cylinders can be accurately measured.

While the presently preferred embodiment of the present invention have been shown and described, it is to be understood that this disclosure is for the purpose of illustration and that various changes and modifications may be made without departing from the spirit and scope of the invention as set forth in the appended claims. Herein the terms "airflow rate of flow" and "airflow rate" simply mean rate of flow.

What is claimed is:

1. A system for measuring intake airflow rate in an engine for a motor vehicle having an intake passage to the engine, and a throttle valve in the intake passage, the intake passage including a first intake passage upstream of the throttle valve and a second intake passage between the throttle valve and cylinders of the engine, the system comprising:
    an airflow meter disposed in the first intake passage for measuring a first intake airflow rate of flow passing in the first intake passage;
    first means for calculating a second intake airflow rate of flow into said second intake passage not entering into the cylinders during opening or closing of the throttle valve; and
    second means for producing a signal representing intake airflow rate of flow actually admitted into the cylinders in accordance with the difference between the first intake airflow rate and the second intake airflow rate;
    the first means comprises third means for calculating the second intake airflow rate based on opening degree of the throttle valve.

2. The system according to claim 1, wherein said third means calculates the second intake airflow rate further based on pressure in the first intake passage and the first intake airflow rate.

3. A system for measuring intake airflow rate in an engine for a motor vehicle having an intake passage to the engine, and a throttle valve in the intake passage, the intake passage including a first intake passage upstream of the throttle valve and a second intake passage between the throttle valve and cylinders of the engine, comprising:
    an airflow meter disposed in the first intake passage for measuring a first intake airflow rate of flow passing in the first intake passage;
    a throttle position sensor for detecting opening degree of the throttle valve and for producing a throttle opening degree signal dependent on opening degree of the throttle valve;
    memory means for storing information which is a function of the throttle opening degree, a constant and a value representing a first pressure in the first intake passage;
    first means responsive to the throttle opening degree signal for obtaining a value of the information from said memory means corresponding to the throttle opening degree signal;
    second means for calculating a second pressure in the second intake passage based on said value of the function, the value of the first pressure obtained from the memory means, and the first intake airflow rate;
    third means for calculating a second intake airflow rate of flow into said second intake passage not entering into the cylinders, based on the second pressure and the constant; and fourth means for producing a signal representing intake airflow rate of flow actually admitted into the cylinders in accordance with the difference between the first intake airflow rate and the second intake airflow rate.

4. The system according to claim 3, wherein said third means calculates the second intake airflow rate by differentiating the second pressure with respect to time and multiplying by the constant.

5. The system according to claim 3, further comprising fifth means for calculating fuel injection time by dividing the signal produced by the fourth means by engine speed.

6. The system according to claim 3, further comprising fifth means for calculating ignition timing as a function of the signal produced by the fourth means and engine speed.

* * * * *